Dec. 24, 1940.  J. A. McNAMARA  2,226,521
VEHICLE DOLLY
Filed July 24, 1939   2 Sheets-Sheet 1
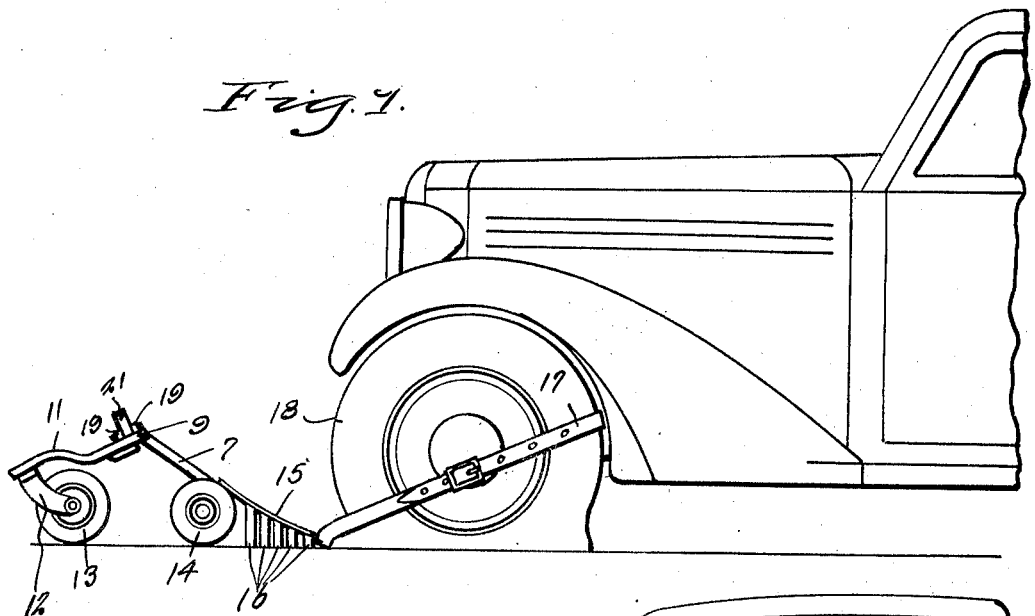
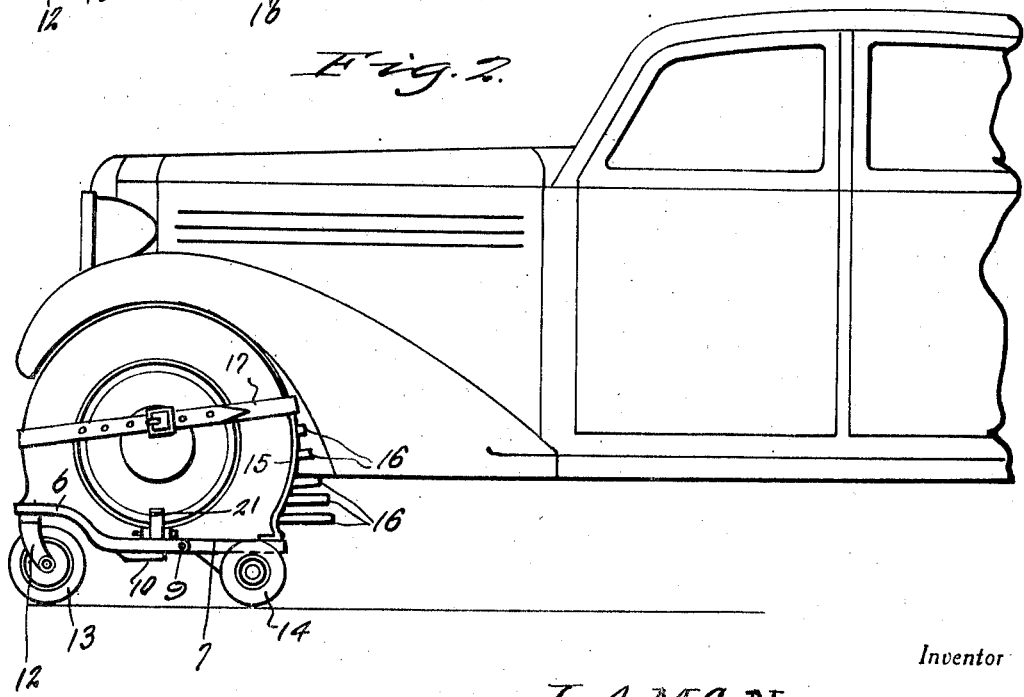
Inventor
J. A. McNamara
By Clarence A. O'Brien
and Hyman Berman
Attorneys

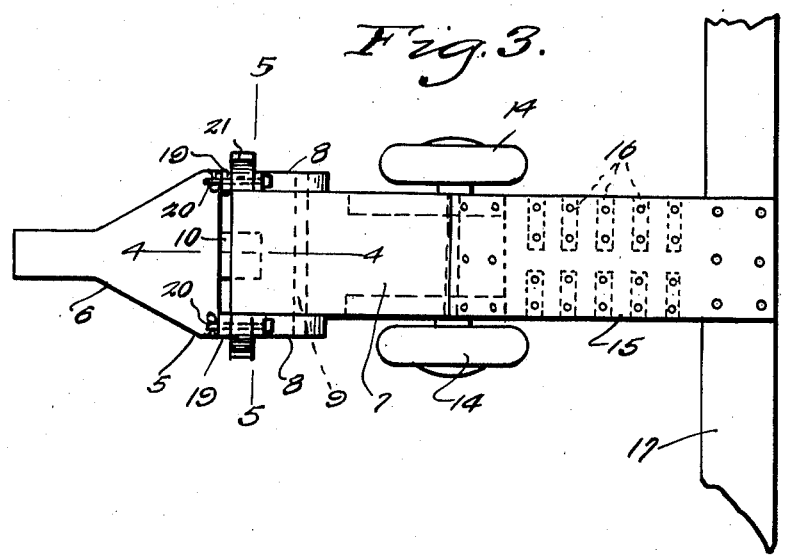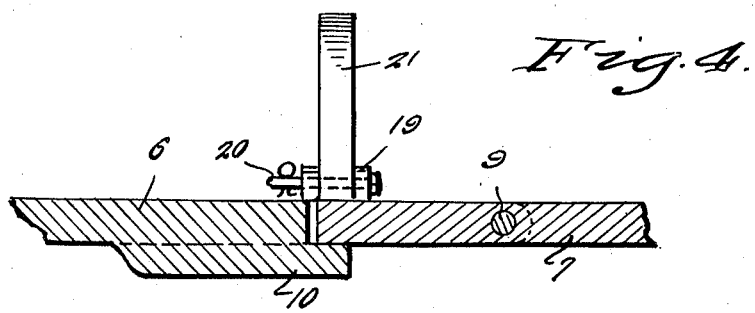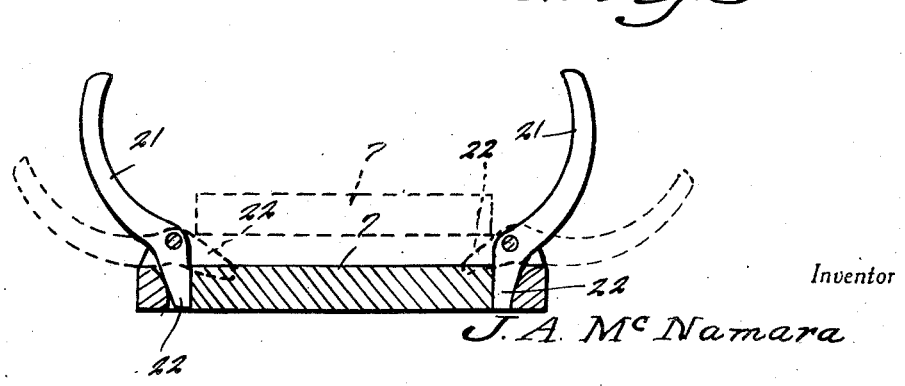

Patented Dec. 24, 1940

2,226,521

UNITED STATES PATENT OFFICE 2,226,521

VEHICLE DOLLY

John A. McNamara, Kansasville, Wis.

Application July 24, 1939, Serial No. 286,270

6 Claims. (Cl. 280—61)

The present invention relates to dollies for vehicles and has for its primary object to provide a jack on which a deflated vehicle tire may be mounted, or driven into a position for supporting the vehicle on the dolly in order to transport the same to a service station or other convenient place for removing the deflated tire and making the necessary repairs thereto.

A further object of the invention is to provide a dolly of this character embodying means for attaching the same to the deflated vehicle tire and also including clamping means for clamping the sides of the tire to firmly secure the same in position on the dolly.

A still further object is to provide a device of this character of simple and practical construction, which is strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a side elevational view showing the dolly in position for receiving the vehicle tire.

Figure 2 is a similar view showing the vehicle mounted in position on the dolly.

Figure 3 is a fragmentary top plan view.

Figure 4 is a fragmentary sectional view taken substantially on the line 4—4 of Fig. 3 and Figure 5 is a fragmentary transverse sectional view taken substantially on a line 5—5 of Fig. 3.

Referring now to the drawings in detail the numeral 5 designates the dolly generally which includes a front end 6 and a rear end 7, the front end having its rear portion provided at its side edges with spaced parallel extensions 8 between which the rear end 7 is positioned and pivotally supported thereon by means of a pin 9 for vertical swinging movement of the front and rear end of the device. A lug 10 extends rearwardly between the extensions 8 upon which the front end of the rear section 7 is adapted to rest to support the parts in a horizontal position. The forward end of the front part 6 is offset upwardly as shown at 11 and secured to the underside of the offset portion is a wheel bracket 12 swivelly connected to the front part 6 and on which a wheel 13 is mounted.

At the rear end of the rear section 7 is mounted a pair of wheels 14 of a size slightly smaller than the front wheel 13.

Extending rearwardly from the dolly is a flexible strap 15, preferably of heavy leather or the like and to the underside of which is secured a double row of legs 16 which gradually decrease in height rearwardly. To the rear end of the strap 15 is a transversely extending strap 17 adapted to extend around a vehicle wheel 18 in the manner as shown in Figs. 1 and 2 of the drawings for attaching the dolly thereto.

When the legs 16 are positioned upon the ground in the manner as shown in Fig. 1 the variation in height between the wheel 13 and the wheels 14 will cause the rear section 7 to occupy an upwardly and forwardly inclined position whereby the vehicle may be driven onto the dolly, causing the parts 6 and 7 to resume their horizontal position as shown in Fig. 2 whereby to support the wheel thereon.

A pair of spaced ears 19 are formed on each of the extensions 8 through which a pin 20 is inserted and on the pin is pivotally mounted a clamping jaw 21 for engaging the side wall of the tire when the same is positioned on the dolly. Each of the jaws having a lower extension 22 which projects inwardly, and under the section 7 as shown by the dotted lines in Fig. 5 of the drawings, when the jaws are spread apart, whereby the weight of the wheel riding upon the rear section will cause a closing movement of the outer upper portion of the jaws into clamping relation.

It is believed the details of construction and the manner of operation of the device will be readily understood from the foregoing without further detailed explanation.

What is claimed is:

1. A vehicle dolly comprising a pair of wheeled sections adapted to support a vehicle wheel, an inclined runway including a flexible surface and rigid supporting means therefor adapted for elevating the vehicle wheel onto the sections and means for securing the sections to the vehicle wheel.

2. A vehicle dolly comprising a carriage adapted to support a vehicle wheel, an inclined runway including a flexible surface and rigid supporting means therefor, said runway being connected to one end of the carriage for elevating the vehicle wheel onto the carriage and means attachable to the wheel for anchoring the carriage while the wheel is being moved into position on the carriage.

3. A vehicle dolly comprising a carriage adapted to support a vehicle wheel, an inclined runway including a flexible surface and rigid supporting means therefor, said runway being connected to one end of the carriage for elevating the vehicle wheel onto the carriage and a strap extending from the carriage for attaching to the vehicle wheel.

4. A vehicle dolly comprising a carriage adapted to support a vehicle wheel, an inclined runway connected to one end of the carriage for elevating the vehicle wheel onto the carriage, means for attaching the carriage to the vehicle wheel and including a manually manipulated attaching element and an automatically operable tire clamping element.

5. A vehicle dolly comprising a pair of wheeled sections pivotally connected and adapted for moving their connected ends upwardly, means for supporting the sections in a horizontal position, a flexible inclined runway projecting from one of the sections, and attaching means carried by said runway for securing the same to a vehicle tire.

6. A vehicle dolly comprising a pair of wheeled sections pivotally connected and adapted for moving their connected ends upwardly, means for supporting the sections in a horizontal position, a flexible runway projecting from one of the sections, legs under said runway decreasing in height toward its free end to support the runway in an inclined position leading toward the sections, a flexible attaching member carried by said runway for securing the same to a vehicle tire and a pair of tire clamping members pivotally carried by one of said sections and operable by the lowering movement of the other section to clamp the same against opposite sides of the tire.

JOHN A. McNAMARA.